US010278241B2

(12) United States Patent
Shibuya et al.

(10) Patent No.: US 10,278,241 B2
(45) Date of Patent: Apr. 30, 2019

(54) HEATING COOKER

(71) Applicant: Panasonic Intellectual Property Management Co., Ltd., Osaka-shi, Osaka (JP)

(72) Inventors: Masaki Shibuya, Osaka (JP); Akira Kataoka, Shiga (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 62 days.

(21) Appl. No.: 15/537,076

(22) PCT Filed: Jun. 7, 2016

(86) PCT No.: PCT/JP2016/002730
§ 371 (c)(1),
(2) Date: Jun. 16, 2017

(87) PCT Pub. No.: WO2016/199395
PCT Pub. Date: Dec. 15, 2016

(65) Prior Publication Data

US 2017/0347408 A1 Nov. 30, 2017

(30) Foreign Application Priority Data

Jun. 9, 2015 (JP) ................................ 2015-116544

(51) Int. Cl.
*H05B 6/64* (2006.01)
*H05B 6/80* (2006.01)
(Continued)

(52) U.S. Cl.
CPC ......... *H05B 6/6479* (2013.01); *F24C 15/327* (2013.01); *H05B 6/687* (2013.01)

(58) Field of Classification Search
CPC ...... H05B 6/6479; H05B 6/687; F24C 15/327
(Continued)

(56) References Cited

U.S. PATENT DOCUMENTS 6,040,564 A * 3/2000 Ueda .................. H05B 6/6479 219/401
2012/0298655 A1 11/2012 Kamii et al.

FOREIGN PATENT DOCUMENTS

CN 102753894 A 10/2012
JP 03-023087 U * 3/1991
JP 2007-271104 10/2007

OTHER PUBLICATIONS

International Search Report of PCT application No. PCT/JP2016/002730 dated Sep. 6, 2016, 4 pages.

(Continued)

*Primary Examiner* — Quang T Van
(74) *Attorney, Agent, or Firm* — Brinks Gilson & Lione

(57) ABSTRACT

Heating chamber for heating food, a steam generating device for generating steam, steam chamber disposed in heating chamber, and steam introduction channel for introducing steam generated by the steam generating device to steam chamber are included. Steam chamber discharge channel for introducing water accumulated in steam chamber to outside of steam chamber is provided. Therefore, a sanitary heating cooker capable of preventing food from being immersed with condensed water, as well as preventing heating chamber from being flooded with water overflowing from steam chamber can be provided.

9 Claims, 9 Drawing Sheets

(51) Int. Cl.

| | |
|---|---|
| ***A23L 3/10*** | (2006.01) |
| ***A47J 27/17*** | (2006.01) |
| ***H05B 6/68*** | (2006.01) |
| ***F24C 15/32*** | (2006.01) |

(58) Field of Classification Search

USPC ....... 219/682, 681, 400, 401, 412, 705, 757, 219/758; 426/433, 231, 510, 509, 523; 99/280, 410, 452, 485, 324, 325, 330; 422/289, 295, 299, 306, 307; 392/399, 392/401; 126/21 A, 20, 273.5

See application file for complete search history.

(56) References Cited

OTHER PUBLICATIONS

English Translation of Chinese Search Report dated Aug. 3, 2018 for the related Chinese Patent Application No. 201680007660.X.

* cited by examiner

HEATING COOKER

This application is a 371 application of PCT/JP2016/002730 having an international filing date of Jun. 7, 2016, which claims priority to JP 2015-116544 filed Jun. 9, 2015, the entire contents of which are incorporated herein by reference.

TECHNICAL FIELD

The present invention relates to a heating cooker.

BACKGROUND ART

A heating cooker for use in steam cooking has been disclosed. The heating cooker includes, in a heating chamber, a steamer having a steam inlet, and a steam generating nozzle for ejecting steam (for example, see PTL 1).

In the heating cooker disclosed in PTL 1, the steam generating nozzle and the steam inlet of the steamer are separated at a distance, and steam is ejected from the steam generating nozzle toward the steam inlet of the steamer. Therefore, steam can be filled in the steamer for steam cooking.

With such a conventional configuration of the heating cooker, after food is heated by steam, water condensed from steam and moisture containing food components including starch coming out of the food sometimes remain on an internal bottom face of the steamer. Therefore, after steam heat cooking is repeated, and, in such a state, when food is steam heated, the food could be immersed in water. Otherwise, water could overflow from the steam inlet to outside of the steamer, and water could then accumulate in the heating chamber.

Such residual water would excessively consume high frequency energy during high frequency heating, thus would require an extended food heating time. In addition, fungus could propagate in the steamer in which water is left behind, which leads to an unsanitary environment in the steamer.

CITATION LIST

Patent Literature

PTL 1: Unexamined Japanese Patent Publication No. 2007-271104

SUMMARY OF THE INVENTION

The present invention provides a sanitary heating cooker capable of reducing residual water for effective food heating.

A heating cooker according to the present invention includes a heating chamber for heating food, a steam generating device for generating steam, a steam chamber disposed in the heating chamber, a steam introduction channel one end of which is coupled to the steam generating device and another end is coupled to the steam chamber, and a steam chamber discharge channel one end of which is coupled to the steam chamber. The steam introduction channel is configured to introduce steam generated by the steam generating device to the steam chamber, and the steam chamber discharge channel is configured to discharge water in the steam chamber to outside of the steam chamber.

According to this configuration, condensed water and moisture containing food components including starch coming out of food dropped, after steam heating, in the steam chamber can be discharged outside of the steam chamber.

Therefore, food can be prevented from being immersed with condensed water, as well as the heating chamber can be prevented from being flooded with water overflowing from the steam chamber.

In high frequency heating using microwaves, heat can be prevented from being wasted by residual water for achieving effective heating of food. In addition, fungus that can propagate due to residual water can be prevented from propagating for contributing to provision of a sanitary heating cooker.

DETAILED DESCRIPTION OF THE EXEMPLARY EMBODIMENTS

Exemplary embodiments of the present invention will be described below with reference to the drawings. However, the present invention is not restricted by the exemplary embodiments.

First Exemplary Embodiment

An appearance configuration of a heating cooker according to an exemplary embodiment of the present invention will be described below with reference to FIG. 1. Respective directions referred in the below descriptions are as follows: an opening side of heating chamber 2 that will be described later as front, an opposite side as rear, a right side when viewed from the front to the rear as right, and a left side when viewed from the front to a body as left.

Figure 1:
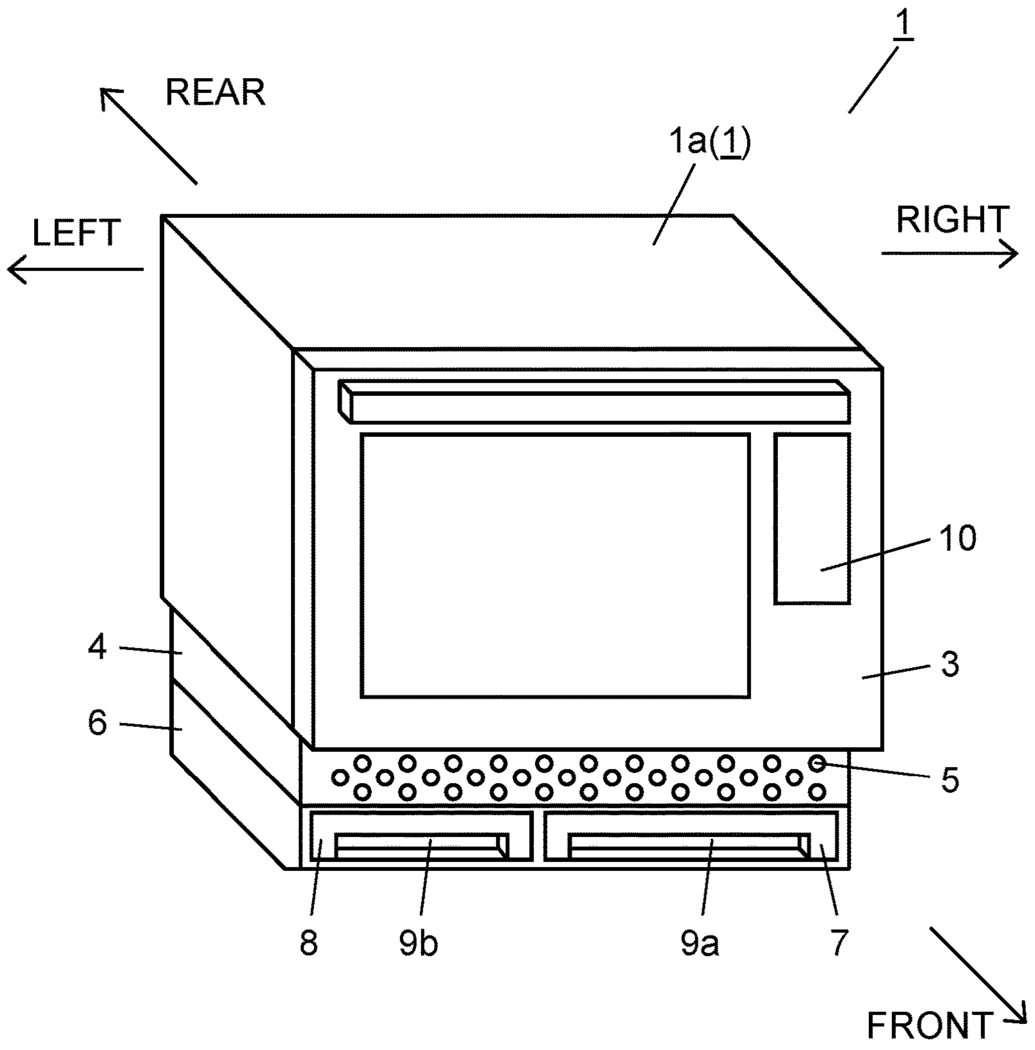
FIG. 1 is a perspective view of a heating cooker according to a first exemplary embodiment of the present invention.

FIG. 1 is a perspective view of a heating cooker according to a first exemplary embodiment of the present invention.

As shown in FIG. 1, heating cooker 1 according to this exemplary embodiment includes body 1*a*, door 3, bottom plate 4, tank case 6, and the like. Inside body 1*a*, heating chamber 2 (see FIG. 2) is formed, and an opening is provided on a front face. On the opening, door 3 is openably provided. When a user turns and opens door 3 toward him or her, the user can dispose or remove, through the opening of body 1*a*, food in or from heating chamber 2.

Bottom plate 4 is provided under body 1*a* of heating cooker 1 to support heating chamber 2. Bottom plate 4 includes a plurality of inlets 5 on the opening side of heating chamber 2 (front side) for introducing cooling air, via inlets 5, into heating cooker 1.

Tank case 6 is provided under bottom plate 4 for supporting bottom plate 4. Tank case 6 extends in a width almost identical to a width of a whole surface of the opening of heating chamber 2 for detachably accommodating water supply tank 7 and water discharge tank 8. Water supply tank 7 and water discharge tank 8 respectively include, on front face sides, recess 9*a* and recess 9*b* for easy loading and unloading by a user.

Water supply tank 7 and water discharge tank 8 are made of a transparent or translucent resin such as an acrylic resin, and are configured to allow a user to know stored water amounts.

Door 3 is openably provided so as to, for example, open in a front direction about a lower end portion near bottom plate 4. On its front face, door 3 includes operation display 10 through which a user is able to set a cooking menu or a cooking time.

In addition, body 1*a* of heating cooker 1 is further provided with a safety switch (not shown) used to stop an operation of each heat source of heating cooker 1 (described later) when door 3 is opened during cooking.

As described above, an appearance of heating cooker 1 according to this exemplary embodiment is configured.

An internal configuration of the heating cooker according to this exemplary embodiment will be described below with reference to FIG. 2, when viewed from a front face.

Figure 2:
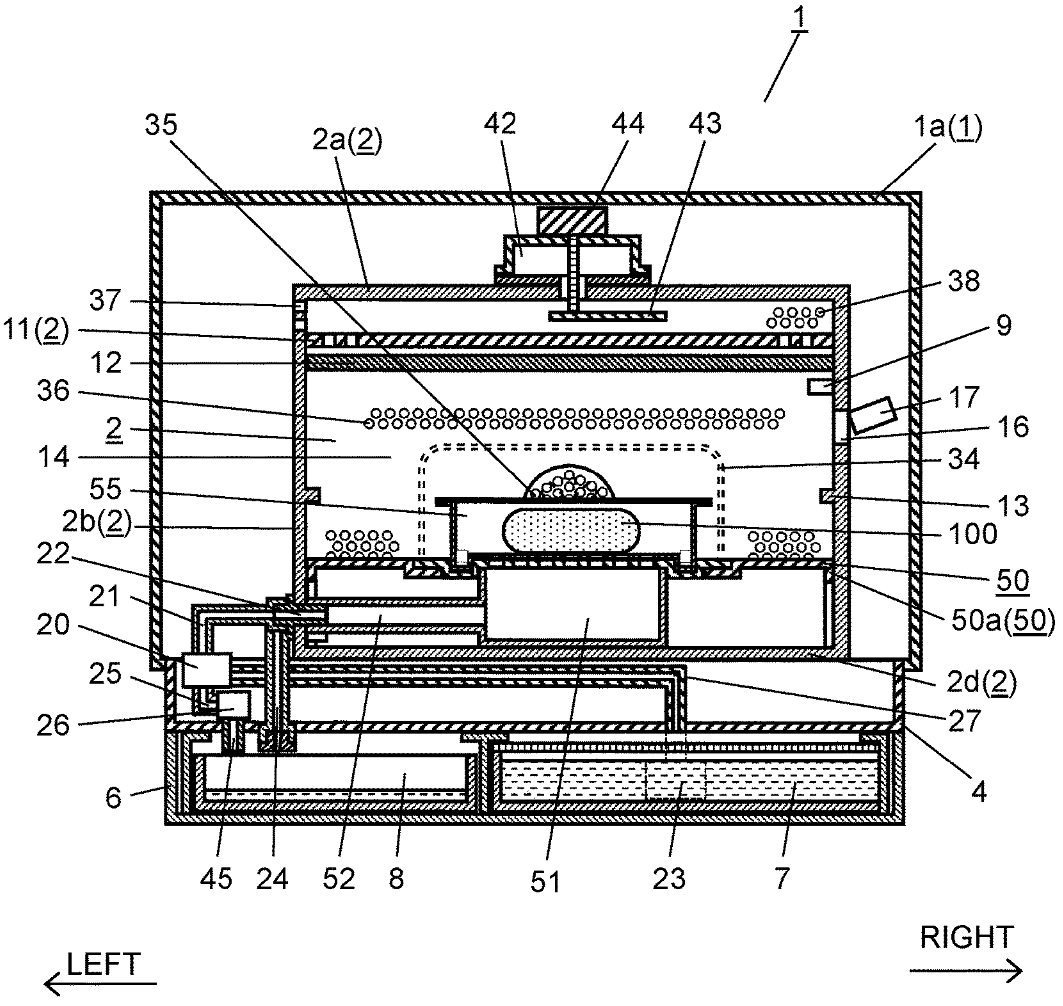
FIG. 2 is a front cross-sectional view of the heating cooker according to the first exemplary embodiment.

FIG. 2 is a front cross-sectional view of the heating cooker according to the first exemplary embodiment.

As shown in FIG. 2, ceiling wall 2*a*, side walls 2*b*, and bottom face 2*d* of heating chamber 2 are made of, for example, aluminum plated steel sheets, internal surfaces of which are fluorine coated. Heating chamber 2 is internally provided with top plate 11, heating chamber heater 12, partition wall 14 (see FIG. 3), and the like. Top plate 11 is made of, for example, mica, and disposed near ceiling wall 2*a* of heating chamber 2. Heating chamber heater 12 is disposed under top plate 11 in parallel with each other so as to extend toward rear, and configured by, for example, three bar heaters. Partition wall 14 is disposed near rear side wall 2*b* of heating chamber 2 to configure an inner wall. Heating chamber 2 is grounded with an earth cord (not shown). Therefore, improved safety is achieved.

Rails 13 are integrally molded on left and right side walls 2*b* of heating chamber 2. Rails 13 detachably retain a loading tray (not shown) and the like. Rails 13 are also grounded in a similar manner to heating chamber 2.

In this exemplary embodiment, fluorine coated internal surfaces of heating chamber 2 for easy cleaning are exemplified. However, the internal surfaces may be coated with enamel or another heat-resistance material. Another material, such as stainless steel, other than the above described material, may be used for heating chamber 2.

Heating chamber 2 includes, at a top right of partition wall 14, a plurality of heating chamber exhaust holes 38 for exhausting air in heating chamber 2 to outside.

In addition, heating chamber 2 is provided with, at a top of right side wall 2*b*, internal thermistor 9 and infrared sensor 17. Internal thermistor 9 detects an ambient temperature in heating chamber 2. Infrared sensor 17 detects, through detection hole 16 provided on right side wall 2*b* of heating chamber 2, a temperature of food 100 and food container 55 in heating chamber 2.

Steam generating device 20 is provided, as shown in FIG. 2, below and outside of heating chamber 2 in body 1*a* to generate steam to be supplied into steam chamber 51. Steam generating device 20 is coupled with, at a top, steam guide channel 21 for supplying steam from left side wall 2*b* of heating chamber 2 into heating chamber 2. At a tip of steam guide channel 21 near left side wall 2*b* of heating chamber 2, steam ejection port 22 is provided. Steam ejection port 22 ejects steam into heating chamber 2 in a horizontal direction.

Below steam generating device 20, tank case 6 for accommodating water supply tank 7 and water discharge tank 8 is disposed. Steam generating device 20 and water supply tank 7 are coupled by water supply channel 27, and water is supplied, via water supply pump 23, to steam generating device 20.

Heating chamber 2 is provided with, on left side wall 2*b*, heating chamber discharge channel 24 for discharging water from heating chamber 2. Bottom steam generating device 20, steam generating device discharge channel 25 for discharging water from steam generating device 20 is provided. Steam generating device discharge channel 25 is coupled, via water discharge valve 26, to discharge channel 45 for allowing water to flow into water discharge tank 8. Steam guide channel 21, heating chamber discharge channel 24, steam generating device discharge channel 25, and discharge channel 45 are formed of, for example, silicone tubes.

In this exemplary embodiment, a configuration is exemplified, where water supply tank 7 is disposed to right, while water discharge tank 8 is disposed to left. However, these positions may be reversed. Water supply tank 7 and water discharge tank 8 may be disposed in a front-back direction.

As shown in FIG. 2, in heating chamber 2, loading table 50 having side walls 50*a* is disposed to have a predetermined gap so as to approximately entirely (including entire face) cover bottom face 2*d*. Therefore, loading table 50 is detachably disposed in heating chamber 2.

In this exemplary embodiment, loading table 50 approximately entirely covering bottom face 2*d* of heating chamber 2 is exemplified. However, a configuration may be applied, where bottom face 2*d* is only partially covered. A configuration is exemplified, where side walls 50*a* of loading table 50 abut on bottom face 2*d* of heating chamber 2 to support loading table 50. However, this configuration is merely an example. For example, loading table 50 may be provided with leg shapes so that side walls 50*a* of loading table 50 are raised from bottom face 2*d* of heating chamber 2. In other words, a configuration may be applied, where loading table 50 is supported by the leg shapes above bottom face 2*d* of heating chamber 2 or above rails 13.

Next, an internal configuration of heating cooker 1, when viewed from a side, will be described with reference to FIG. 3.

Figure 3:
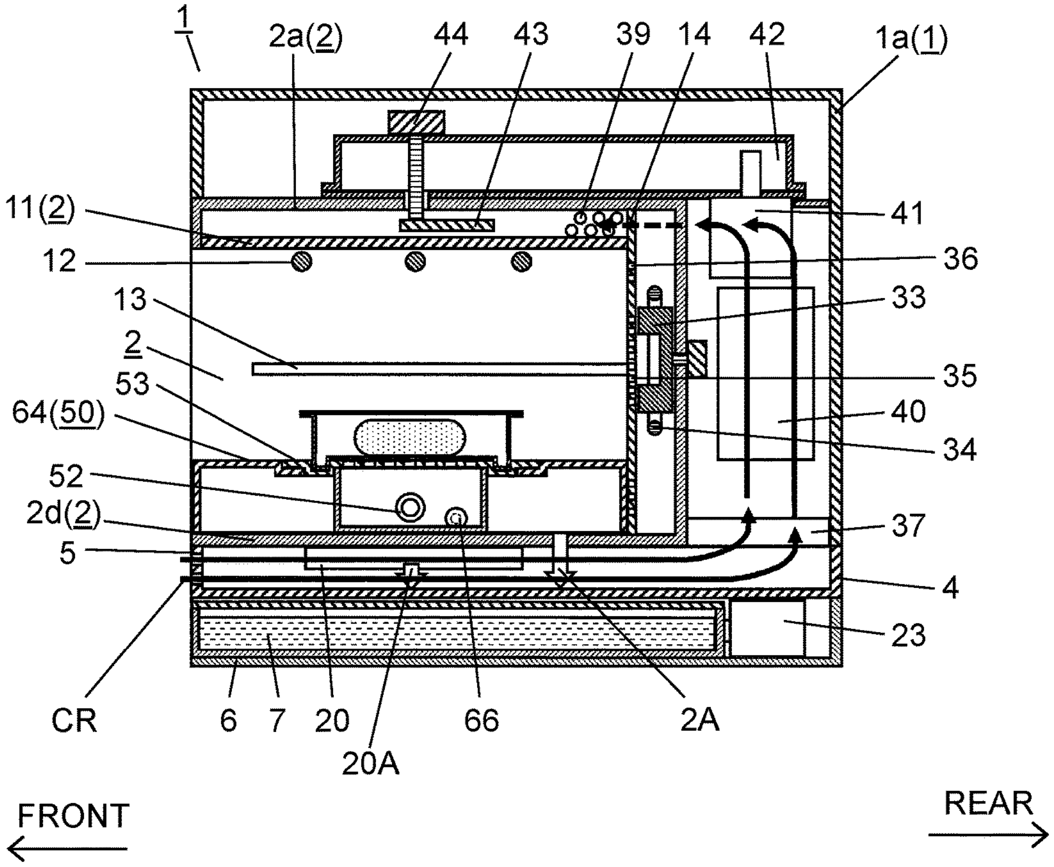
FIG. 3 is a side cross-sectional view of the heating cooker according to the first exemplary embodiment, where a door is removed.

FIG. 3 is a side cross-sectional view of heating cooker 1 according to the exemplary embodiment, where door 3 is removed.

As shown in FIG. 3, heating chamber 2 includes, on a rear, a space partitioned by partition wall 14. In the space, circulating fan 33, convection heater 34, and the like are provided. Circulating fan 33 agitates and circulates air in heating chamber 2. Convection heater 34 configures a chamber interior heater for heating air circulating in heating chamber 2. At this time, convection heater 34 is disposed to surround circulating fan 33.

Partition wall 14 includes a plurality of air intake ventilation holes 35 and a plurality of air blow ventilation holes 36 provided above air intake ventilation holes 35. Through air intake ventilation holes 35, air in heating chamber 2 moves to circulating fan 33. Through air blow ventilation holes 36, in contrast, air heated by convection heater 34 moves from circulating fan 33 to heating chamber 2.

Inlets 5 are formed, as described above, on a front face of bottom plate 4 lying between heating chamber 2 and water supply tank 7 and water discharge tank 8. Cooling air suctioned by cooling fan 37 is taken into inlets 5 when heating. The taken-in cooling air flows, via areas between heating chamber 2, steam generating device 20 and water supply tank 7, water discharge tank 8, and is suctioned toward rear. At this time, when the cooling air flows, as shown in FIG. 3, heat transfer 2A during heating from heating chamber 2 to tank case 6, as well as heat transfer 20A from steam generating device 20 to tank case 6 are prevented.

The suctioned cooling air flows toward and cools controller 40, magnetron 41 configuring a microwave generating portion, and the like. After the cooling air has cooled the above described components, the cooling air flows from air intake holes 39 into heating chamber 2. The cooling air then exits, via heating chamber 2, from heating chamber exhaust holes 38 to outside of heating cooker 1. Therefore, cooling route CR shown with arrows is formed for cooling and ventilating inside heating chamber 2. Air intake ventilation holes 35, air blow ventilation holes 36, heating chamber exhaust holes 38, and air intake holes 39 are formed with, for example, a plurality of punching holes.

In this exemplary embodiment, a configuration is exemplified, where inlets 5 are provided above water supply tank 7 and water discharge tank 8, and on the front face of bottom plate 4 at an approximately uniform (including uniform) density to evenly prevent heat transfers 2A, 20A from occurring from heating chamber 2 and steam generating device 20. However, this configuration is merely an example. In accordance with a position of a member that should be prevented from being cooled or heated, a location, number, and/or area of inlets 5 to be formed may be altered. For example, the more inlets 5 provided near steam generating device 20, the more steam generating device 20 can intensively be cooled. In short, as long as a configuration can be achieved, in which cooling air is introduced to cool controller 40 and the like by providing inlets 5 on bottom plate 4 lying between heating chamber 2 and water supply tank 7 or water discharge tank 8, inlets 5 may be formed in any location, number, and area.

Body 1*a* includes, behind heating chamber 2, for example, magnetron 41 disposed upwardly in a vertical direction to configure a microwave generating portion. Magnetron 41 is coupled to wave guide 42 for transmitting microwaves to heating chamber 2. Wave guide 42 is formed by, for example, bending and welding two aluminum plated steel sheets to form an internal channel into which microwaves transmit.

Heating chamber 2 is provided with, at around a center of ceiling wall 2*a*, rotating antenna 43 for agitating microwaves transmitted through wave guide 42. Rotating antenna 43 is made of, for example, an aluminum plated steel sheet, and coupled to motor 44. Rotating antenna 43 is driven and rotated by motor 44 to agitate microwaves and to apply the microwaves to food and the like to be heated in heating chamber 2.

In this exemplary embodiment, a configuration is exemplified, where magnetron 41, wave guide 42, rotating antenna 43, and motor 44 are provided above heating chamber 2. However, this configuration is merely an example. For example, the above described components may be provided near bottom face 2*d* or any of side walls 2*b* of heating chamber 2. The above described components may be oriented in desired directions.

In this exemplary embodiment, a configuration is exemplified, where rotating antenna 43 agitates and applies microwaves. However, this configuration is merely an example. For example, a configuration may be applied, where rotating antenna 43 is not provided, but microwaves are supplied from an outlet opening of wave guide 42 into heating chamber 2. Therefore, a simplified configuration can be achieved.

In addition, as shown in FIG. 3, controller 40 is provided behind heating chamber 2. Controller 40 controls, in accordance with a cooking menu selected by a user, magnetron 41, motor 44, circulating fan 33, cooling fan 37, heating chamber heater 12, convection heater 34, internal thermistor 9, infrared sensor 17, water supply pump 23, operation display 10, internal light (not shown), and the like.

As described above, the inside of heating cooker 1 viewed from a side wall side is configured.

Next, a detailed configuration around loading table 50 in heating chamber 2 of heating cooker 1 will be described with reference to FIG. 4.

Figure 4:
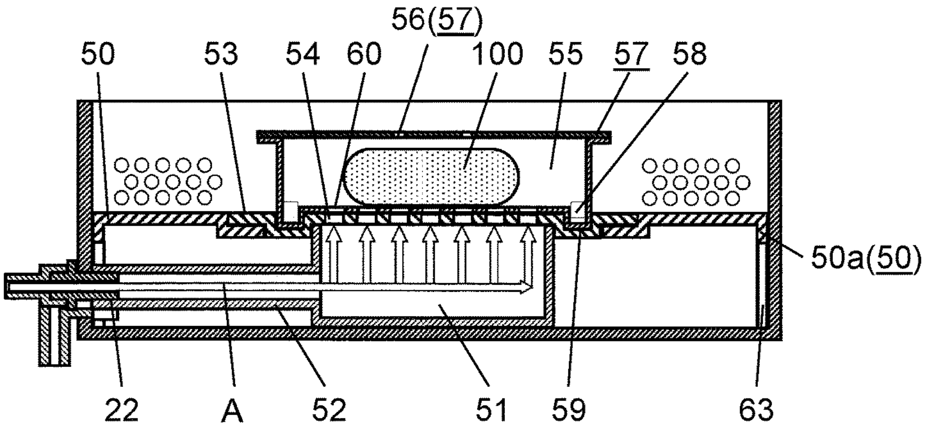
FIG. 4 is a front cross-sectional view illustrating a configuration around a loading table of the heating cooker according to the first exemplary embodiment.

FIG. 4 is a front cross-sectional view illustrating a configuration around loading table 50 of the heating cooker according to the exemplary embodiment.

Loading table 50 is formed in, as shown in FIG. 4, an approximately rectangular parallelepiped (including rectangular parallelepiped) box shape, and has an opening on a bottom. A top face of loading table 50 is formed in approximately plan (including plan). Loading table 50 is disposed at a height of approximately 40 mm, for example, from bottom face 2*d* of heating chamber 2 to have a space, and lies in approximately parallel (including parallel) to bottom face 2*d* of heating chamber 2.

Under loading table 50, steam chamber 51 and steam introduction channel 52 having, for example, a cylindrical shape and coupled to steam chamber 51 are provided. Steam introduction channel 52 is disposed in a horizontal direction on left of steam chamber 51. At this time, a shape inside of steam introduction channel 52 is formed approximately identical (including identical) to a shape outside of steam ejection port 22. Steam introduction channel 52 detachably fits to the outside of steam ejection port 22 in an overlapped manner with a length of, for example, approximately 30 mm. Therefore, a step that could narrow steam channel A is not formed at a fitting portion. Therefore, since steam ejected from steam ejection port 22 would be less likely to enter into a gap at the fitting portion, steam can be prevented as much as possible from leaking to outside. At this time, a packing may be provided between steam ejection port 22 and steam introduction channel 52. Therefore, steam can further be prevented from leaking. A lock mechanism may be provided to lock cylindrical-shaped steam ejection port 22 and steam introduction channel 52 when fitting each other. At this time, as long as a configuration for preventing steam from leaking is applied, in contrast, a shape inside of steam ejection port 22 and a shape outside of steam introduction channel 52 may be formed to be approximately identical. In this case, by detachably fitting steam introduction channel 52 in an overlapped manner to the inside of steam ejection port 22, steam channel A can be formed.

Loading table 50 has an opening at an approximately center portion (including center portion), and opening plate 53 is disposed on the opening from above. Opening plate 53 is formed with opening plate recess 59 to fit with loading table 50 and steam chamber 51, and is detachably locked. Opening plate 53 is formed with, on an approximately center portion (including center portion), a plurality of penetrating opening plate holes 54. A top face of opening plate 53, on which opening plate holes 54 are provided, is formed approximately flush (including flush) with the top face of loading table 50, and food container 55 and the like are disposed on opening plate 53.

Food container 55 is formed in an approximately rectangular parallelepiped shape (including rectangular parallelepiped shape) that has an opening on a top, and accommodates a heat-target object that is food 100. Food container 55 includes, on a bottom, a plurality of food container holes 60, and food container protrusion 58 externally protruding from the bottom. The opening of food container 55 is covered with cover 57 having a plurality of penetrating steam holes 56. Therefore, a space is formed for internally filling steam. Food container holes 60 of food container 55 are preferably formed at positions facing opening plate holes 54 of opening plate 53.

At this time, food container 55 is locked by fitting food container protrusion 58 with opening plate recess 59 formed on opening plate 53. Therefore, a structure can be achieved, in which steam to be supplied into food container 55 is prevented as much as possible from leaking outside of the container.

For food container 55, via food container holes 60 formed on the bottom and opening plate holes 54 formed on opening plate 53, food container 55 is in communication with steam chamber 51.

In this exemplary embodiment, a configuration is exemplified, where opening plate 53 and loading table 50 are separate parts. However, this configuration is merely an example. For example, a configuration may be applied, where opening plate 53 is not provided, but a plurality of through holes are provided on the top face, where no opening is provided, of loading table 50.

In this exemplary embodiment, a configuration is exemplified, where food container 55 for accommodating food 100 is disposed on opening plate 53 for heating. However, this configuration is merely an example. For example, a configuration may be applied, where food 100 is directly disposed on opening plate 53 for heating.

In this exemplary embodiment, a configuration is exemplified, where food container 55 is a rectangular parallelepiped container. However, this configuration is merely an example. For example, as long as food can be enclosed, food container 55 may have any form such as a bag. In other words, a configuration may be applied, where food 100 and the like can be wrapped, and an opening is provided. In this case, materials for enclosing food 100 may include, but not specifically limited to, in addition to the above described resin, paper, rubber, and materials that can resist heat of steam.

Loading table 50 includes, as shown in FIG. 4, loading table notches 63 on both side walls 50*a* lying in a front-back direction. Loading table notches 63 are formed, when loading table 50 is disposed in heating chamber 2, at positions that do not interfere steam introduction channel 52 and steam chamber discharge introduction port 67 (see FIG. 7). Therefore, even if loading table 50 is inserted into heating chamber 2 in a wrong, left-right orientation, loading table 50 can be installed without coming into contact with steam introduction channel 52 and steam chamber discharge introduction port 67. As a result, ease of work improves.

In this exemplary embodiment, steam introduction channel 52, steam chamber 51, opening plate 53, and loading table 50 are made of a microwave-transmittable, heat-resistant polypropylene resin having a heat-resisting temperature of 120° C. In addition to a heat-resistant polypropylene resin, another material such as silicone resin may be used.

In this exemplary embodiment, steam ejection port 22 and steam introduction channel 52 provided in a horizontal direction are exemplified. However, steam ejection port 22 and steam introduction channel 52 may be provided by fitting each other in an inclined direction or a vertical direction.

In this exemplary embodiment, although not specifically exemplified, food 100 may include refrigerated or frozen Chinese steamed bun, dumpling, rice, noodles. However, food 100 is not limited to the above described examples. In addition, a quantity of food 100 is not limited to one, but any number may be applied. Further, heat-target objects may include wet towel and table cloth and the like, other than food.

As described above, components around loading table 50 in heating chamber 2 are configured.

Next, a detailed configuration of loading table 50 and opening plate 53 disposed in heating chamber 2 will be described with reference to FIG. 5.

Figure 5:
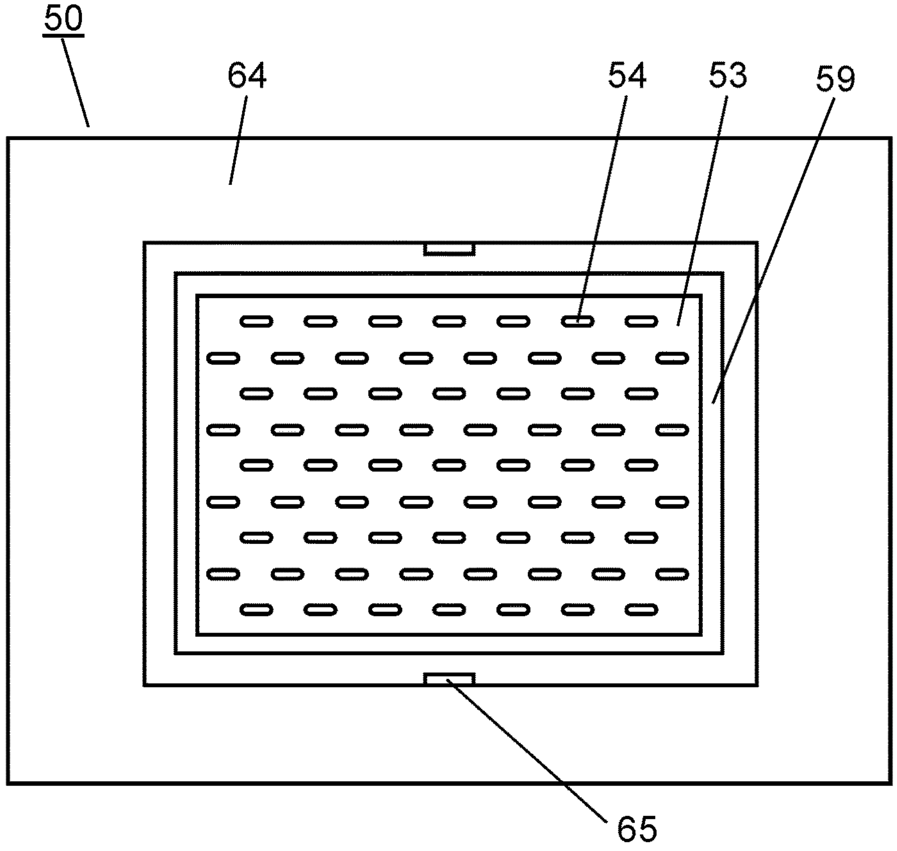
FIG. 5 is a top view of the loading table of the heating cooker according to the first exemplary embodiment.

FIG. 5 is a top view of loading table 50 and opening plate 53 of the heating cooker according to the exemplary embodiment.

As shown in FIG. 5, loading table 50 is formed in, for example, an approximately rectangular (including rectangular), thin-plate shape having an opening at a center, and includes flat portion 64 where no through hole is provided. Flat portion 64 is provided around opening plate 53 disposed on the opening.

Opening plate 53 is formed in, for example, an approximately rectangular (including rectangular), thin-plate shape, and is disposed on the opening at the center of loading table 50.

Opening plate 53 includes opening plate holes 54, opening plate recess 59, opening plate notches 65, and the like.

A plurality of opening plate holes 54 is each formed in, for example, an oval track having longer sides in a longitudinal direction of loading table 50, and is dispose in a zigzag manner. An arbitral hole shape may be applied for opening plate holes 54, including a circular shape and a rectangular shape, as long as the shape which allows steam to pass therethrough. However, depending on a size or shape of each of opening plate holes 54, food 100 would be likely to pass through the hole. Therefore, a hole shape or the like of opening plate holes 54 are preferably selected as required depending on a size and shape of food 100.

Two opening plate notches 65, for example, are provided on opening plate 53 in a front-back direction. Therefore, a user can insert a finger or nail into each of opening plate notches 65 to easily remove opening plate 53 from loading table 50 for cleaning and other purposes. Opening plate 53 and loading table 50 may be configured to fit with claws each other. Therefore, opening plate 53 can be prevented from being raised from loading table 50 due to pressure of steam supplied from steam chamber 51.

Opening plate recess 59 is provided to correspond to food container protrusion 58 of food container 55, and locks food container 55 through fitting.

Next, a configuration of food container 55 disposed on loading table 50 will be described with reference to FIG. 6.

Figure 6:
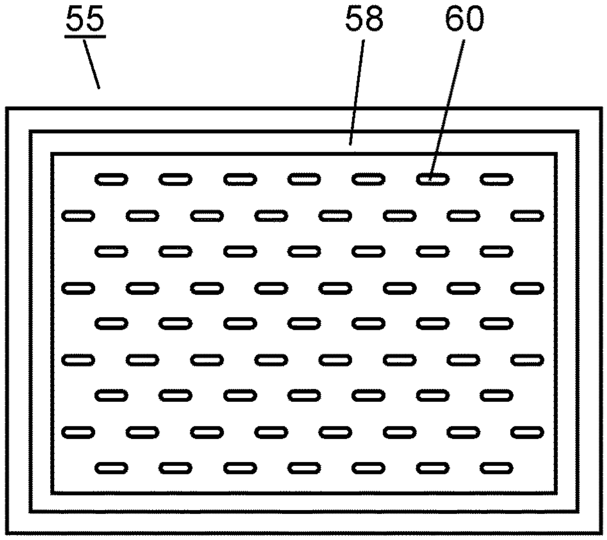
FIG. 6 is a top view of a food container of the heating cooker according to the first exemplary embodiment, where a cover is removed.

FIG. 6 is a top view of food container 55 of heating cooker 1 according to the exemplary embodiment, where cover 57 is removed.

As shown in FIG. 6, food container 55 is formed in, when viewed from top, for example, an approximately rectangular shape (including rectangular shape), and includes, on a bottom, food container protrusion 58 and food container holes 60. Food container holes 60 are each formed in an approximately identical size and disposed at approximately identical positions to a size and positions of opening plate holes 54 of opening plate 53.

Food container protrusion 58 is provided to correspond to opening plate recess 59 of opening plate 53 described above, and locks food container 55 through fitting. Therefore, food container holes 60 and opening plate holes 54 can easily coincide with each other. As long as steam can be supplied into food container 55, food container holes 60 and opening plate holes 54 may not fully coincide, but may partially coincide.

Next, a configuration around steam chamber 51 on which opening plate 53 and food container 55 are disposed will be described with reference to FIG. 7.

Figure 7:
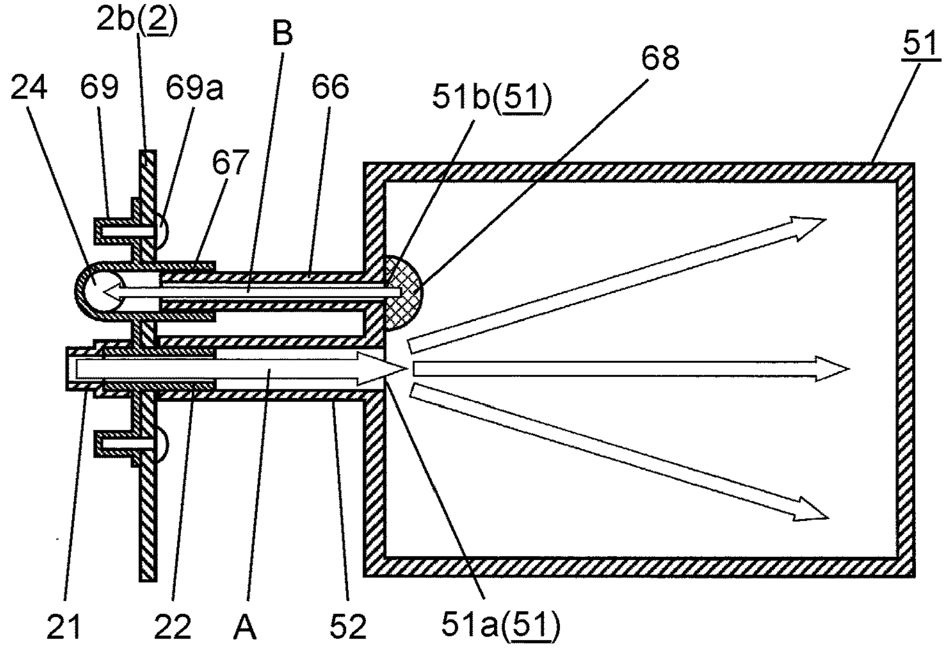
FIG. 7 is a top cross-sectional view illustrating a configuration around a steam chamber of the heating cooker according to the first exemplary embodiment.

FIG. 7 is a top cross-sectional view illustrating a configuration around steam chamber 51 of heating cooker 1 according to the exemplary embodiment.

As shown in FIG. 7, steam chamber 51 is formed in, when viewed from top, for example, an approximately rectangular shape (including rectangular shape), and includes steam introduction channel 52 and steam chamber discharge channel 66. Steam introduction channel 52 and steam chamber discharge channel 66 are disposed in approximately parallel (including parallel) with each other. An end of steam introduction channel 52 and an end of steam chamber discharge channel 66 are respectively coupled to steam chamber introduction opening 51*a* and steam chamber discharge opening 51*b* on a left side wall of steam chamber 51, and fixed to steam chamber 51. At this time, steam chamber introduction opening 51*a* coupled with the end of steam introduction channel 52 and steam chamber discharge opening 51*b* coupled with the end of steam chamber discharge channel 66 are formed aligned on an identical wall surface configuring steam chamber 51.

Steam generated by steam generating device 20 and passed via steam guide channel 21, steam ejection port 22, and steam introduction channel 52 is supplied from steam chamber introduction opening 51*a* to steam chamber 51. On the other hand, water condensed from steam and moisture containing food components including such as starch coming out of food, which are accumulated in steam chamber 51 during heating, are discharged via steam chamber discharge opening 51*b* of steam chamber 51, steam chamber discharge channel 66, steam chamber discharge introduction port 67, and heating chamber discharge channel 24. In other words, a direction of steam channel A, which represents a flow of steam in steam introduction channel 52 and is shown with an arrow, is formed with a flow in a direction opposite to a direction of discharge channel B, which represents a flow of moisture in steam chamber discharge channel 66 and is shown with an arrow.

A shape inside of steam chamber discharge introduction port 67 is formed approximately identical (including identical) to a shape outside of steam chamber discharge channel 66. Steam chamber discharge channel 66 detachably fits to the inside of steam chamber discharge introduction port 67 in an overlapped manner with a length of, for example, approximately 30 mm. Steam chamber discharge channel 66 is then coupled to heating chamber discharge channel 24. Therefore, water condensed from steam and moisture containing food components including such as starch coming out of food, which are dropped in steam chamber 51, can be discharged from steam chamber 51 via steam chamber discharge channel 66.

In other words, in this exemplary embodiment, an inner diameter of steam chamber discharge channel 66 is smaller than an inner diameter of steam introduction channel 52. Therefore, a channel pressure loss in steam chamber discharge channel 66 can be increased. Therefore, steam flowed through steam introduction channel 52 into steam chamber 51 is less likely to flow into steam chamber discharge channel 66. As a result, a loss of steam supplied into food container 55 can be reduced, and food 100 and the like can effectively be heated.

In this exemplary embodiment, the inside of steam chamber discharge introduction port 67 fits to the outside of steam chamber discharge channel 66. Therefore, for discharge channel B representing a flow of water, a step at a fitting portion, which could narrow discharge channel B, can be eliminated. Therefore, moisture and the like to be discharged via the fitting portion can be prevented as much as possible from leaking to outside. At this time, a packing may be provided between steam chamber discharge introduction port 67 and steam chamber discharge channel 66. A lock mechanism may be provided to lock steam chamber discharge channel 66 and cylindrical-shaped steam chamber discharge introduction port 67 when fitting each other. Therefore, moisture can further be prevented from leaking.

As long as a configuration for preventing moisture from leaking is applied, in contrast, a shape outside of steam chamber discharge introduction port 67 and a shape inside of steam chamber discharge channel 66 may be formed to be approximately identical. In this case, by detachably fitting steam chamber discharge channel 66 in an overlapped manner to the outside of steam chamber discharge introduction port 67, discharge channel B can be formed.

Steam chamber discharge introduction port 67 and steam ejection port 22 are, as shown in FIG. 7, for example, formed in an integrated component having two bosses 69. By tightening screws 69*a* into bosses 69 from inside of side wall 2*b* of heating chamber 2, steam chamber discharge introduction port 67 and steam ejection port 22 can be fixed to heating chamber 2. Therefore, an installation error can be prevented from occurring at a time of installation to heating chamber 2, and steam introduction channel 52 and steam chamber discharge channel 66 can easily fit. In addition, such reduction in numbers of components achieves a more simple configuration.

As shown in FIG. 7, onto steam chamber discharge opening 51*b* of steam chamber 51, for example, mesh-formed, hemisphere steam chamber filter 68 is detachably provided. Steam chamber filter 68 is made of, for example, a microwave-transmittable, heat-resistant polypropylene resin having a heat-resisting temperature of approximately 120° C. Steam chamber filter 68 prevents fragments of foods accumulated in steam chamber 51 from entering into steam chamber discharge channel 66. Therefore, steam chamber discharge channel 66 is prevented from clogging to prevent as much as possible a water discharge capability from lowering. In addition, steam chamber filter 68 is detachably formed. Therefore, even if fragments of foods clog in steam chamber filter 68, a user is able to easily remove and clean steam chamber filter 68.

In this exemplary embodiment, steam chamber filter 68 made of a heat-resistant polypropylene resin is exemplified. However, another material such as a polycarbonate resin may be used.

In this exemplary embodiment, steam guide channel 21, steam ejection port 22, steam introduction channel 52, steam chamber discharge channel 66, steam chamber discharge introduction port 67, and heating chamber discharge channel 24 each having a circular shape in cross section are exemplified. However, for example, an oval shape or a rectangular shape may be applied.

In this exemplary embodiment, a configuration is exemplified, where steam guide channel 21, steam ejection port 22, heating chamber discharge channel 24, and steam chamber discharge introduction port 67 are provided on left side wall 2*b* of heating chamber 2. However, the above described components may be provided on, for example, right side wall 2*b* or rear side wall 2*b*. In other words, the above described components may be provided on an arbitral wall surface of heating chamber 2.

In this exemplary embodiment, maximum inner sizes of holes formed on a side face of heating chamber 2, into which steam ejection port 22 and steam chamber discharge introduction port 67 are inserted for coupling steam guide channel 21 and heating chamber discharge channel 24, are preferably, even though not specified, a maximum of ½ of a wavelength of a microwave. Since the heating cooker according to this exemplary embodiment uses microwaves at a wavelength of approximately 120 mm, maximum inner sizes of holes on the side face of heating chamber 2 are each formed to, for example, a maximum of 60 mm. Therefore, microwaves can be prevented from leaking from steam ejection port 22 and steam chamber discharge introduction port 67.

In this exemplary embodiment, a configuration is exemplified, where steam introduction channel 52 and steam chamber discharge channel 66 are disposed in approximately parallel with each other. However the configuration is merely an example. For example, as long as steam does not directly flow into steam chamber discharge channel 66, an arbitral angle and position may be applied. In addition, without respectively interposing steam ejection port 22 and steam chamber discharge introduction port 67, steam guide channel 21 and steam introduction channel 52, as well as heating chamber discharge channel 24 and steam chamber discharge channel 66, may respectively be coupled and fixed. Therefore, steam can be prevented as much as possible from leaking.

In this exemplary embodiment, a configuration is exemplified, where single steam introduction channel 52 and single steam chamber discharge channel 66 are provided to steam chamber 51. However, a configuration may be applied, for example, where a plurality of steam introduction channels 52 and a plurality of steam chamber discharge channels 66 are provided. Therefore, since supplying steam and discharging water can be achieved in a dispersed manner, inner diameters of steam channel A and discharge channel B can be reduced. Therefore, sizes of holes formed on a wall surface of heating chamber 2 can also be reduced. As a result, microwaves leaking from heating chamber 2 to outside can further be reduced.

Next, a positional relationship between steam introduction channel 52 and steam chamber discharge channel 66 respectively coupled to steam chamber 51 will be described with reference to FIG. 8.

Figure 8:
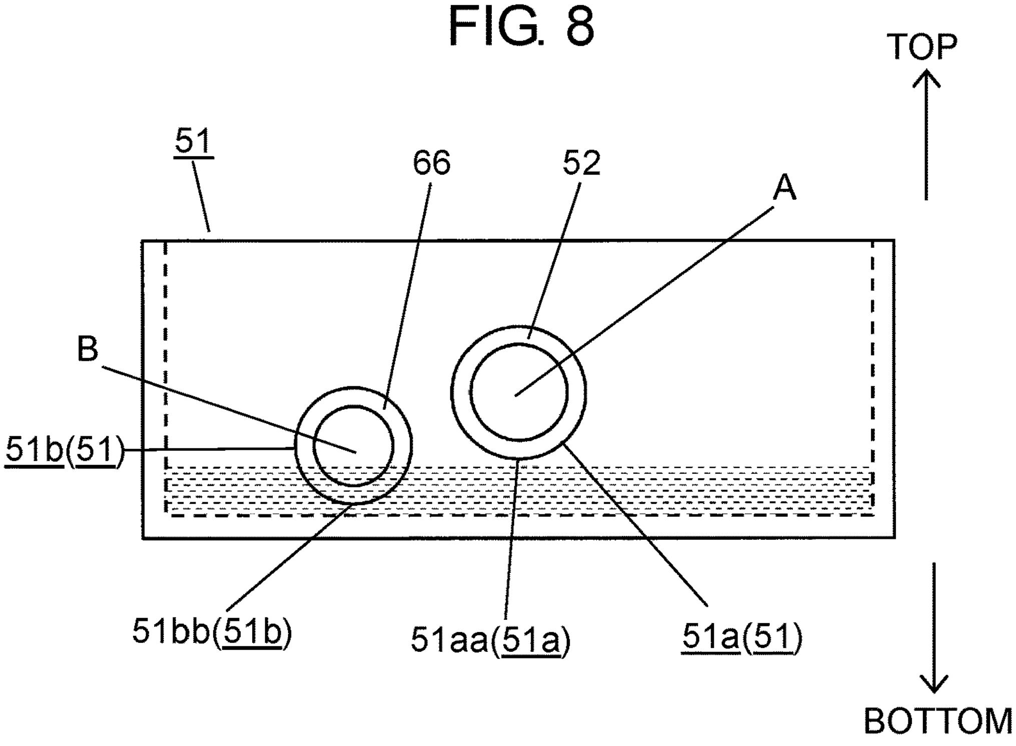
FIG. 8 is a left side view of the steam chamber of the heating cooker according to the first exemplary embodiment.

FIG. 8 is a left side view of steam chamber 51 of the heating cooker according to the exemplary embodiment.

As shown in FIG. 8, an end of steam introduction channel 52 is attached to steam chamber introduction opening 51*a* of steam chamber 51 so as to eject steam toward an approximately center portion (including center portion) of steam chamber 51.

On the other hand, an end of steam chamber discharge channel 66 is attached to steam chamber discharge opening 51*b* of steam chamber 51 so as to discharge moisture and the like from steam chamber 51.

At this time, lower end 51*bb* of steam chamber discharge opening 51*b* of steam chamber 51 is disposed at a position lower than a position of lower end 51*aa* of steam chamber introduction opening 51*a*. Lower end 51*aa* of steam chamber introduction opening 51*a* is preferably provided at a position higher than a level of water to be accumulated in steam chamber 51 when heating. Therefore, a level of water accumulated in steam chamber 51 reaches lower end 51*bb* of steam chamber discharge opening 51*b* faster than lower end 51*aa* of steam chamber introduction opening 51*a*. Therefore, water accumulated in steam chamber 51 is discharged through steam chamber discharge channel 66, along discharge channel B, to outside of steam chamber 51.

As described above, steam introduction channel 52 and steam chamber discharge channel 66 are disposed to steam chamber 51.

Next, a configuration of heating chamber discharge channel 24 coupled, via steam chamber discharge channel 66, to steam chamber 51 will be described with reference to FIG. 9.

Figure 9:
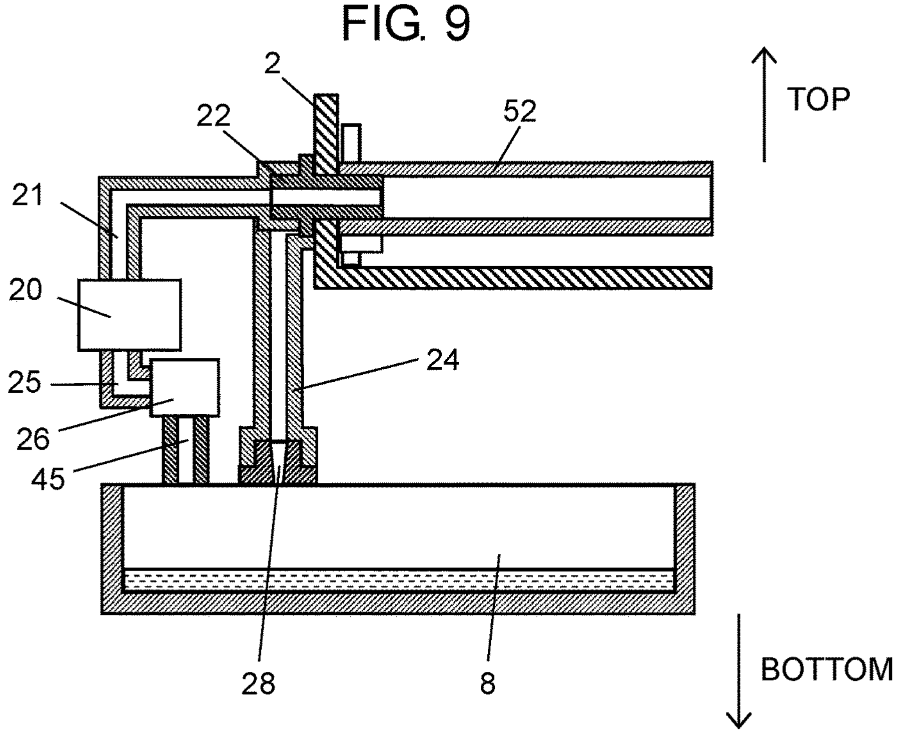
FIG. 9 is a cross-sectional view illustrating a configuration around a heating chamber discharge channel of the heating cooker according to the first exemplary embodiment.

FIG. 9 is a cross-sectional view illustrating a configuration around heating chamber discharge channel 24 of heating cooker 1 according to the exemplary embodiment.

As shown in FIG. 9, discharge channel outlet 28 is separately provided at an end portion on water discharge tank 8 side of heating chamber discharge channel 24. Discharge channel outlet 28 is formed in an orifice shape in which an inner diameter reduces toward water discharge tank 8. Therefore, discharge channel outlet 28 increases a channel pressure loss. Therefore, steam flowed into steam chamber 51 is prevented as much as possible from leaking via heating chamber discharge channel 24 to water discharge tank 8. As a result, steam can effectively be supplied into food container 55.

With a configuration where discharge channel outlet 28 and heating chamber discharge channel 24 are separated, only discharge channel outlet 28 can easily be removed for cleaning.

In this exemplary embodiment, discharge channel outlet 28 having an inner diameter formed in an orifice shape is exemplified. However, this is merely an example. For example, discharge channel outlet 28 may have an inner diameter with no inclination, but have an entirely tapered diameter. In addition, a channel length of discharge channel outlet 28 may be extended. Therefore, discharge channel outlet 28 can also increase a channel pressure loss to prevent, as much as possible, steam from leaking.

In this exemplary embodiment, a configuration is exemplified, where discharge channel outlet 28 and heating chamber discharge channel 24 are separated. However, an integrated configuration may be applied. Therefore, a configuration can be simplified.

In this exemplary embodiment, a configuration is exemplified, where a weight of water itself is used for discharging. However, the configuration is merely an example. For example, a configuration may be applied, where a pump is used to discharge water. Therefore, even a large quantity of condensed water and moisture coming out of food can be quickly discharged from steam chamber 51.

As described above, heating cooker 1 according to this exemplary embodiment is configured.

An operation and an effect of heating cooker 1 configured as described above will be described by each heating method.

(Operation and Effect Through Steam Heating)

An operation and an effect through steam heating will be described below.

First, a user opens door 3 of heating cooker 1. The user fits steam introduction channel 52 of steam chamber 51 and steam ejection port 22 fixed to heating chamber 2, as well as fits steam chamber discharge channel 66 of steam chamber 51 and steam chamber discharge introduction port 67 fixed to heating chamber 2. The user then sets steam chamber 51 on bottom face 2*d* of heating chamber 2.

Next, the user disposes loading table 50, via side walls 50*a*, on bottom face 2*d* of heating chamber 2, and then disposes steam chamber 51 in the opening of loading table 50.

Next, the user sets opening plate 53 to cover the opening of loading table 50.

The above described installation of steam chamber 51, loading table 50, and opening plate 53 is not always required. In other words, the above described installation should be performed when some components are removed for cleaning or other purposes.

Next, the user withdraws water supply tank 7 from tank case 6 and replenishes water from a water filler (not shown) into water supply tank 7. The user then inserts and sets water supply tank 7 into tank case 6. The user also inserts and sets water discharge tank 8 into tank case 6.

Next, the user fits food container protrusion 58 of food container 55 in which food 100 is accommodated to opening plate recess 59 of opening plate 53. Therefore, food container 55 has been set to opening plate 53. At this time, opening plate holes 54 of opening plate 53 are in communication with food container holes 60 of food container 55.

The above described operation should be performed by the user when loading table 50 and the like are normally set in heating chamber 2.

Next, the user closes door 3, and selects a steam cooking menu on operation display 10. The user then, for example, presses a start button or touches an icon of the start button. Therefore, heating of food 100 starts.

Next, upon a heating operation starts, controller 40 drives steam generating device 20 for heating. Upon a temperature of steam generating device 20 fully rises, controller 40 drives water supply pump 23 to supply water from water supply tank 7, via water supply channel 27, to steam generating device 20. Therefore, steam generating device 20 instantaneously generates steam. As described above, steam generating device 20 is heated to allow water to instantaneously evaporate. However, this is merely an example. For example, water stored in steam generating device 20 may be heated to gradually generate steam.

The generated steam passes through steam guide channel 21, and ejects from steam ejection port 22. The ejected steam flows, via steam introduction channel 52, into steam chamber 51, and spreads in steam chamber 51.

The spread steam flows, via opening plate holes 54 and food container holes 60, into food container 55. The flowed steam condenses around whole food 100 to give latent heat of vaporization to evenly heat food 100.

At this time, in a case when food 100 is a porous material with many gaps, such as noodles, steam can easily enter into food 100 to effectively heat from inside.

When steam heating and microwave heating are performed simultaneously, steam filled in food container 55 changes a dielectric constant in a space. Therefore, a wavelength of microwaves in food container 55 shortens. As a result, an effect of reducing unevenness in heating of food 100 can be obtained.

As heating advances, a temperature of food 100 rises, and steam will be less likely to condense on food 100. Therefore, the steam can fill as is in food container 55. The non-condensed, filled steam is finally discharged from steam holes 56 of cover 57 to outside of food container 55. In this case, a configuration may be applied, where steam holes 56 are not provided on cover 57, and filled steam is discharged from a gap between cover 57 and food container 55.

At this time, as heating advances, water condensed from steam, moisture containing food components including starch coming out of food 100, fragments of food 100, and other materials drop and accumulate, via food container holes 60 and opening plate holes 54, onto steam chamber 51. By allowing food 100 to drop excessive moisture onto steam chamber 51, food 100 can be improved in taste with reduced wateriness.

Moisture accumulated in steam chamber 51 flows by its weight, via steam chamber discharge channel 66, steam chamber discharge introduction port 67, heating chamber discharge channel 24, and discharge channel outlet 28, into water discharge tank 8.

Next, upon controller 40 detects a rise in temperature in steam generating device 20, controller 40 causes cooling fan 37 to operate to introduce outside cooling air from inlets 5 of bottom plate 4. Therefore, while preventing as much as possible a temperature of steam generating device 20 and a temperature around steam generating device 20 from increasing, controller 40 can simultaneously be cooled.

Through the above described operation, controller 40 follows a cooking menu selected on operation display 10 to perform steam heating on food 100.

Upon a predetermined period of time set in the cooking menu has passed, controller 40 ends the steam heating operation.

Next, upon heating ends, controller 40 almost simultaneously (including simultaneously) opens water discharge valve 26 to discharge water in steam generating device 20 via steam generating device discharge channel 25. Controller 40 keeps open water discharge valve 26 for a predetermined period of time, and then controller 40 closes water discharge valve 26.

To continue heating of food 100, water discharge valve 26 is closed for a predetermined period of time to retain hot water in steam generating device 20. Therefore, by using the retained hot water to promptly generate steam, heating can be started in a short period of time.

In addition, by causing water discharge valve 26 to open when a user has instructed to discharge water, even if water accumulated in water discharge tank 8 is left undischarged, an overflow of water from water discharge tank 8 due to when water is automatically discharged can be prevented from occurring.

After heated, the user opens door 3, lifts and takes out food container 55 from opening plate 53. Therefore, food 100 can be served to the user or another user. At this time, when heating cooker 1 according to this exemplary embodiment is used in a store, for example, food 100 accommodated in food container 55 can readily be served to a consumer. Therefore, hot, sanitary food 100 can be served to the consumer.

To microwave heat food 100 after food container 55 is removed, without using steam, food 100 can immediately be heated by just disposing food container 55 or food 100 on loading table 50 including opening plate 53.

To forcibly discharge water remaining in steam chamber 51, a user selects, on operation display 10, a maintenance mode. In the maintenance mode, controller 40 ejects steam in an amount greater than an amount in normal steam heating for a longer period of time into steam chamber 51. Therefore, water remained in steam chamber 51 can forcibly be discharged.

Specifically, controller 40 causes steam generating device 20 to generate steam in an amount greater than an amount in normal steam heating for a longer period of time. Controller 40 then ejects the steam, via steam guide channel 21, from steam ejection port 22. The ejected steam flows, via steam introduction channel 52, into steam chamber 51. Due to its greater amount, the steam flowed into steam chamber 51 increases an internal pressure of steam chamber 51, and flows through opening plate holes 54 upwardly. The steam simultaneously pushes out water accumulated on an internal bottom of steam chamber 51. In addition, the steam further flows, via steam chamber discharge channel 66, steam chamber discharge introduction port 67, heating chamber discharge channel 24, and discharge channel outlet 28, into water discharge tank 8. Therefore, the flowed steam forcibly discharges water accumulated in steam chamber 51 into water discharge tank 8.

An example is described above, where, to securely discharge water from steam chamber 51, steam is generated for a longer period of time. However, this is merely an example. For example, if an amount of water to be accumulated in steam chamber 51 is smaller, even steam generated in an amount in a shorter period of time is able to fully discharge the water.

At this time, a configuration may be applied, where a cover member (not shown) is placed on opening plate 53 to cover opening plate holes 54. Therefore, an internal pressure of steam chamber 51 further increases, and thus water in steam chamber 51 can be effectively discharged. Any cover member that does not allow steam to pass through opening plate holes 54 may be used. For example, a ceramic or plastic container may be used. Opening plate holes 54 may not always be fully covered. A cover member that partially covers opening plate holes 54 may be disposed. Therefore, a similar or identical forced discharge effect can be achieved.

As described above, the steam heating operation can be executed.

(Operation and Effect Through Microwave Heating)

Next, an operation and an effect through microwave heating will be described.

First, a user disposes food 100 in heating chamber 2 of heating cooker 1, and then closes door 3. The user selects, on operation display 10, a cooking menu for microwave heating to start heating of food 100.

Next, upon a heating operation starts, controller 40 drives and causes magnetron 41 to radiate microwaves. The microwaves radiated and transmitted through wave guide 42 are supplied to rotating antenna 43 being rotated by motor 44. The microwaves by rotating antenna 43 are agitated and radiated into heating chamber 2.

The microwaves radiated into heating chamber 2 are directly absorbed by moisture contained in food 100 to heat food 100. At this time, controller 40 can control and rotate rotating antenna 43 to alter distribution of microwaves in heating chamber 2. Therefore, in accordance with a type, a shape, a position, and a quantity of food 100, controller 40 can follow the selected cooking menu to select an appropriate distribution capability to heat food 100.

At this time, while magnetron 41 is operating, controller 40 causes cooling fan 37 to operate. Therefore, cooling air can be introduced from inlets 5 to cool magnetron 41, controller 40, and the like.

As described above, the microwave heating operation can be executed.

(Operation and Effect Through Oven Heating)

Next, an operation and an effect through oven heating will be described.

First, a user removes loading table 50, steam chamber 51, and steam introduction channel 52 from heating chamber 2 of heating cooker 1. The user then disposes food 100 on loading tray (not shown) in heating chamber 2, and closes door 3. In addition, the user selects, on operation display 10, a cooking menu for oven heating to start heating of food 100.

Next, upon a heating operation starts, controller 40 drives convection heater 34 for heating. Controller 40 simultaneously causes circulating fan 33 to rotate. As circulating fan 33 rotates, air in heating chamber 2 is introduced from air intake ventilation holes 35, and heated by convection heater 34. The heated air returns, through air blow ventilation holes 36, to heating chamber 2. Therefore, controller 40 allows air in heating chamber 2 to circulate to rise its temperature to heat food 100.

At this time, during oven heating, controller 40 causes cooling fan 37 to operate to introduce cooling air from inlets 5. While preventing heat transfer from heating chamber 2 to water supply tank 7 and water discharge tank 8 (see FIG. 3), cooling air cools controller 40.

Even after the oven operation ends, controller 40 causes cooling fan 37 to operate for a while. Therefore, heat transfer 2A from heating chamber 2 to water supply tank 7 and water discharge tank 8 can effectively be prevented.

As described above, the oven heating operation can be executed.

In the above described exemplary embodiment, configurations are exemplified, where steam heating, microwave heating, and oven heating are separately executed. However, the configurations are merely examples. For example, a configuration may be applied, where grill heating using heating chamber heater 12 and complex heating with microwaves and steam are executed. In addition, a configuration may be applied, where, by using radiant heat and hot blast through heating chamber heater 12 and convection heater 34, individual heating and complex heating are executed.

A configuration may be applied, where, by removing loading table 50, steam chamber 51, and steam introduction channel 52 from heating chamber 2, and directly ejecting steam from steam ejection port 22 into heating chamber 2, steam heating is executed. Therefore, for example, a taller food product can be heated.

A configuration may be applied, where a user directly enters and sets a heating time on operation display 10.

A configuration may be applied, where, when a user selects an automatic menu on operation display 10, heating is executed in accordance with the selected automatic menu. In this case, based on a heating time conforming to the automatic menu, and information detected by internal thermistor 9, infrared sensor 17, and other sensors, controller 40 automatically sets a time appropriate for executing heat cooking. Therefore, ease of operation for users can improve.

As described above, heating cooker 1 according to the exemplary embodiment includes heating chamber 2 for heating food 100, steam generating device 20 for generating steam, steam chamber 51 disposed in heating chamber 2, steam introduction channel 52 one end of which is coupled to steam generating device 20 and another end is coupled to steam chamber 51, and steam chamber discharge channel 66 one end of which is coupled to steam chamber 51. Steam introduction channel 52 is configured to introduce steam generated by steam generating device 20 to steam chamber 51, and steam chamber discharge channel 66 is configured to discharge water in steam chamber 51 to outside of steam chamber 51.

According to this configuration, condensed water and moisture containing food components including starch coming out of food 100 dropped, after steam heating, in steam chamber 51 can be discharged outside of steam chamber 51. Therefore, food 100 can be prevented from being immersed with condensed water, as well as heating chamber 2 can be prevented from being flooded with water overflowing from steam chamber 51.

In high frequency heating using microwaves, heat can be prevented from being wasted by residual water for achieving effective heating of food 100. In addition, fungus that can propagate due to residual water can be prevented from propagating for contributing to sanitary heat cooking.

Heating cooker 1 according to the above described exemplary embodiment includes steam chamber discharge opening 51*b* formed on a wall (for example, side wall 2*b*) of steam chamber 51 and coupled to steam chamber discharge channel 66, and steam chamber introduction opening 51*a* formed on the wall of steam chamber 51 and coupled to steam introduction channel 52, where steam chamber discharge opening 51*b* is provided on a wall surface of steam chamber 51 near the steam chamber introduction opening.

According to this configuration, when steam ejects, via steam introduction channel 52, into steam chamber 51, a direction of steam channel A in steam introduction channel 52 and a direction of discharge channel B in steam chamber discharge channel 66 are opposite each other. Therefore, steam flushed from steam introduction channel 52 into steam chamber 51 can be prevented as much as possible from flowing into steam chamber discharge channel 66. As a result, steam can be prevented as much as possible from leaking to outside, and thus heat efficiency can be prevented from lowering.

In heating cooker 1 according to the above described exemplary embodiment, lower end 51*bb* of steam chamber discharge opening 51*b* is disposed at a position lower than a position of lower end 51*aa* of steam chamber introduction opening 51*a*. According to this configuration, when water accumulates in steam chamber 51, and a level of water raises, before water in steam chamber 51 flows backward, via steam introduction channel 52, into steam generating device 20, the water first flows into steam chamber discharge channel 66 and is discharged. Therefore, components of food 100 accumulated in steam chamber 51 can be prevented from flowing into steam generating device 20 and adhering onto steam generating device 20. As a result, a steam capability can be prevented from lowering.

Heating cooker 1 according to the above described exemplary embodiment includes a steam chamber discharge introduction port 67 for introducing water discharging via steam chamber discharge channel 66 from steam chamber 51 to outside of steam chamber discharge channel 66, where steam chamber discharge introduction port 67 is detachably provided to steam chamber discharge channel 66. According to this configuration, steam chamber discharge channel 66 can be detachably provided to steam chamber discharge introduction port 67. Therefore, water and dirt accumulated in steam chamber discharge channel 66 can easily be cleaned.

In heating cooker 1 according to the above described exemplary embodiment, steam chamber discharge channel 66 is provided near steam ejection port 22 of steam introduction channel 52. According to this configuration, when steam introduction channel 52 and steam ejection port 22 fit each other, steam chamber discharge channel 66 also simultaneously comes closer to steam chamber discharge introduction port 67. Therefore, both components can easily fit each other.

In heating cooker 1 according to the above described exemplary embodiment, a maintenance mode is provided for increasing an amount of steam generated by steam generating device 20 from an amount of steam generated in normal heating to increase an internal pressure in steam chamber 51. According to this configuration, the increased internal pressure in steam chamber 51 pushes out water that is accumulated in steam chamber 51, and thus is less likely to flow by its weight into steam chamber discharge channel 66. Therefore, residual water in steam chamber 51 can forcibly be discharged.

In this exemplary embodiment, heating cooker 1 for generating microwaves is exemplified. However, this is merely an example. For example, as long as a heating cooker includes at least steam generating device 20, an identical effect can be obtained.

Second Exemplary Embodiment

A heating cooker according to a second exemplary embodiment of the present invention will be described with reference to FIG. 10 to FIG. 11C.

Figure 10:
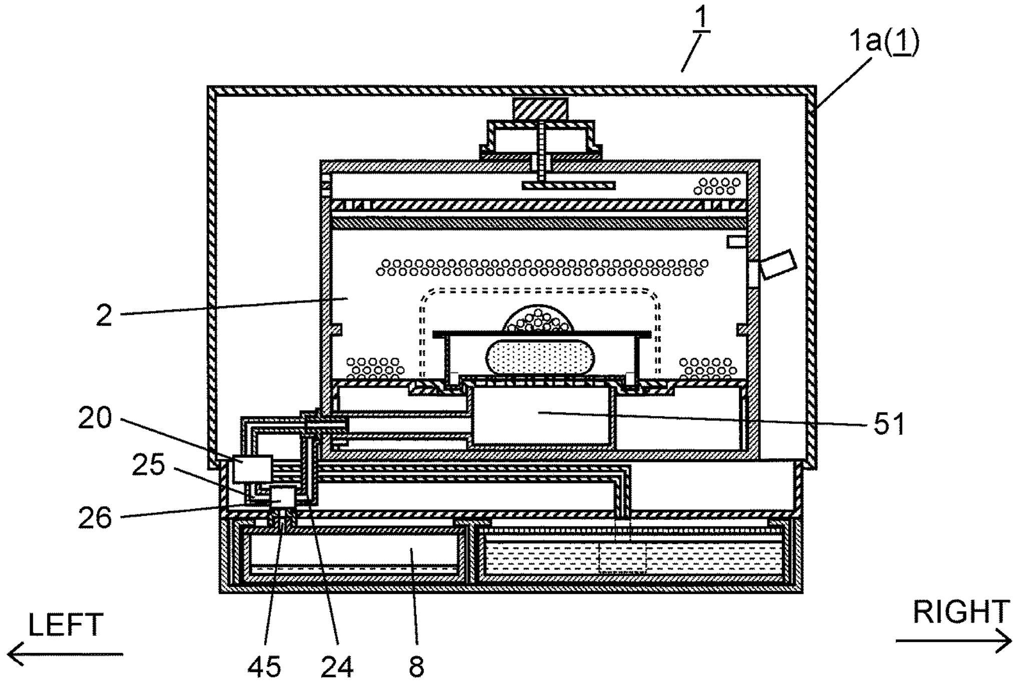
FIG. 10 is a front cross-sectional view of a heating cooker according to a second exemplary embodiment of the present invention.

FIG. 10 is a front cross-sectional view of the heating cooker according to the second exemplary embodiment of the present invention.

As shown in FIG. 10, since heating chamber discharge channel 24 and steam generating device discharge channel 25 are configured to be switchable by water discharge valve 26, heating cooker 1 according to this exemplary embodiment differs from the heating cooker according to the first exemplary embodiment. Since other configurations and effects are identical to the configurations and effects of the first exemplary embodiment, identical components are applied with identical numbers or symbols, and detailed descriptions are omitted.

Differences from the configurations and operations of the first exemplary embodiment will now mainly be described herein.

In heating cooker 1 according to this exemplary embodiment, heating chamber discharge channel 24, steam generating device discharge channel 25, and discharge channel 45 for allowing water to flow into water discharge tank 8 are coupled to water discharge valve 26 formed of a three-way valve.

In other words, water discharge valve 26 switches heating chamber discharge channel 24 and steam generating device discharge channel 25 to couple the switched channel with discharge channel 45. Water flowed from heating chamber discharge channel 24 or steam generating device discharge channel 25 coupled to discharge channel 45 is discharged into water discharge tank 8.

A specific operation of water discharge valve 26 will be described with reference to FIG. 11A to FIG. 11C.

Figure 11A:
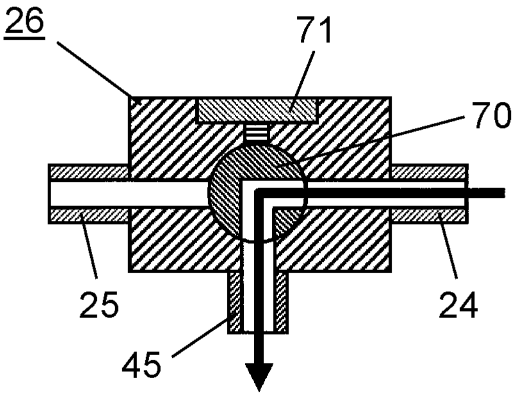
FIG. 11A is a cross-sectional view illustrating an operation of a water discharge valve when discharging water from a heating chamber of the heating cooker according to the second exemplary embodiment.

FIG. 11A is a cross-sectional view illustrating an operation of a water discharge valve when discharging water from a heating chamber of the heating cooker according to the exemplary embodiment. FIG. 11B is a cross-sectional view illustrating another operation of the water discharge valve when discharging water from a steam generating device of the heating cooker according to the exemplary embodiment. FIG. 11C is a cross-sectional view illustrating still another operation of the water discharge valve when not discharging water from the heating cooker according to the exemplary embodiment.

First, as shown in FIG. 11A, water discharge valve 26 internally includes a structure for rotating, with water discharge valve motor 71, ball valve 70 having an approximately L-shaped (including L-shaped) hole. Water discharge valve 26 switches, in accordance with an angle of ball valve 70, heating chamber discharge channel 24 or steam generating device discharge channel 25 so that the switched channel is in communication with discharge channel 45.

In other words, to make heating chamber discharge channel 24 to be in communication with discharge channel 45, as shown in FIG. 11A, water discharge valve 26 rotates ball valve 70 to an angle at which heating chamber discharge channel 24 is in communication with discharge channel 45. Therefore, water discharged from heating chamber 2 flows through heating chamber discharge channel 24 and discharge channel 45.

Figure 11B:
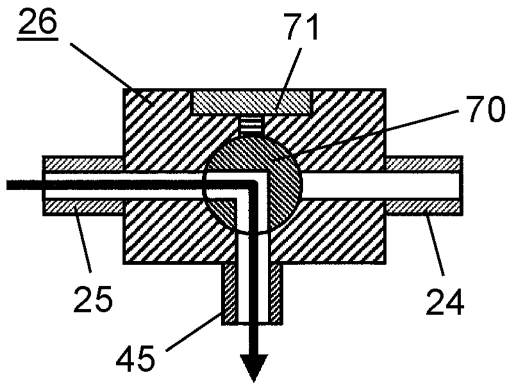
FIG. 11B is a cross-sectional view illustrating another operation of the water discharge valve when discharging water from a steam generating device of the heating cooker according to the second exemplary embodiment.

On the other hand, to make steam generating device discharge channel 25 to be in communication with discharge channel 45, as shown in FIG. 11B, water discharge valve 26 rotates ball valve 70 180 degrees from a state shown in FIG. 11A. Therefore, ball valve 70 is disposed at an angle at which steam generating device discharge channel 25 is in communication with discharge channel 45. As a result, water discharged from heating chamber 2 flows through steam generating device discharge channel 25 and discharge channel 45.

Figure 11C:
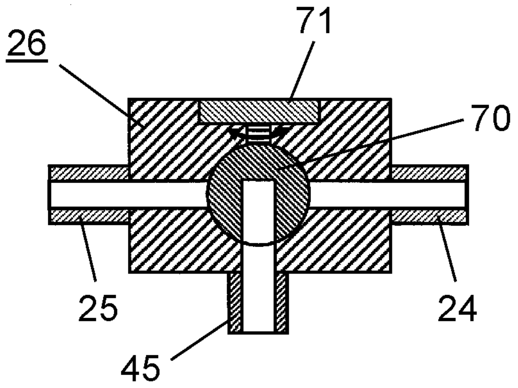
FIG. 11C is a cross-sectional view illustrating still another operation of the water discharge valve when not discharging water from the heating cooker according to the second exemplary embodiment.

To make both heating chamber discharge channel 24 and steam generating device discharge channel 25 to be not in communication with discharge channel 45, as shown in FIG. 11C, water discharge valve 26 rotates ball valve 70 90 degrees clockwise from a state shown in FIG. 11A (in a case of FIG. 11B, 90 degrees counterclockwise). At this time, ball valve 70 is disposed at an angle at which neither heating chamber discharge channel 24 nor steam generating device discharge channel 25 is in communication with discharge channel 45. Therefore, a configuration where no water flows can be achieved. This state is normally a basic position of ball valve 70 for other than discharging water.

At this time, water discharge valve motor 71 includes a hall IC for detecting as an origin a position of ball valve 70 shown in FIG. 11C. Based on detection of the hall IC, water discharge valve motor 71 rotates ball valve 70 from the origin 90 degrees clockwise, or 90 degrees counterclockwise to switch discharge channel 45.

Specifically, water discharge valve motor 71 is formed of a stepping motor. Based on an entry of pulses in a predetermined number for rotating ball valve 70 90 degrees clockwise or counterclockwise, water discharge valve motor 71 rotates ball valve 70.

As water discharge valve motor 71, an ordinary DC motor may be used, instead of a stepping motor. In this case, by detecting an angle of 90 degrees with a hall IC to stop the DC motor from rotating, similar or identical effect and result can be obtained.

As described above, the heating cooker according to this exemplary embodiment is configured.

An operation and an effect of the heating cooker configured as described above will be described.

Since other operations than the operation of water discharge valve 26 are identical to the operations of the first exemplary embodiment, detailed descriptions are omitted.

In other words, for example, upon steam heating ends through an operation similar or identical to the operation of first exemplary embodiment, controller 40 almost simultaneously causes ball valve 70 of water discharge valve 26 to rotate so that the state shown FIG. 11A is achieved. Therefore, a state shown in FIG. 11C, where heating chamber discharge channel 24 and steam generating device discharge channel 25 are closed, switches to a state where steam generating device discharge channel 25 is open and in communication with discharge channel 45. Therefore, water in steam generating device 20 can be discharged.

After steam generating device discharge channel 25 is open for a predetermined period of time, controller 40 again operates water discharge valve 26 to rotate ball valve 70 so that the state shown in FIG. 11A is achieved. Therefore, heating chamber discharge channel 24 opens to discharge water in steam chamber 51 through steam chamber discharge channel 66 and steam chamber discharge introduction port 67.

In addition, after heating chamber discharge channel 24 is open for a predetermined period of time, controller 40 again operates water discharge valve 26 to rotate ball valve 70 so that the state shown in FIG. 11C is achieved. Therefore, both heating chamber discharge channel 24 and steam generating device discharge channel 25 close.

To continue heating, steam generating device discharge channel 25 is closed for a predetermined period of time to retain hot water in steam generating device 20. The retained hot water may be used for heating to promptly generate steam.

In addition, by causing either or both of heating chamber discharge channel 24 and steam generating device discharge channel 25 to open when a user has instructed to discharge water, even if water accumulated in water discharge tank 8 is left undischarged, an overflow of water from water discharge tank 8 due to when water is automatically discharged can be prevented from occurring.

As described above, heating cooker 1 according to this exemplary embodiment includes heating chamber discharge channel 24 for introducing water flowed from steam chamber discharge introduction port 67 to outside of heating chamber 2, and water discharge valve 26 disposed in a middle of a route from steam chamber discharge channel 66 to heating chamber discharge channel 24. Therefore, by opening or closing water discharge valve 26, a timing for discharging water can be controlled. Therefore, even if water discharge tank 8 is not inserted, a floor can be prevented from being flooded with discharged water. Steam can also be prevented from leaking to outside.

Heating cooker 1 according to this exemplary embodiment includes steam generating device discharge channel 25 for introducing water accumulated in steam generating device 20 to outside of steam generating device 20, where water discharge valve 26 is formed of a three-way valve in which a valve is provided in a middle of a route from steam chamber discharge channel 66 to heating chamber discharge channel 24, while another valve is provided in a middle of steam generating device discharge channel 25. Therefore, with single water discharge valve 26, switching of discharge water can be achieved. Therefore, small-sized, light-weight heating cooker 1 can be achieved.

Third Exemplary Embodiment

A heating cooker according to a third exemplary embodiment of the present invention will be described with reference to FIG. 12 to FIG. 14.

Figure 12:
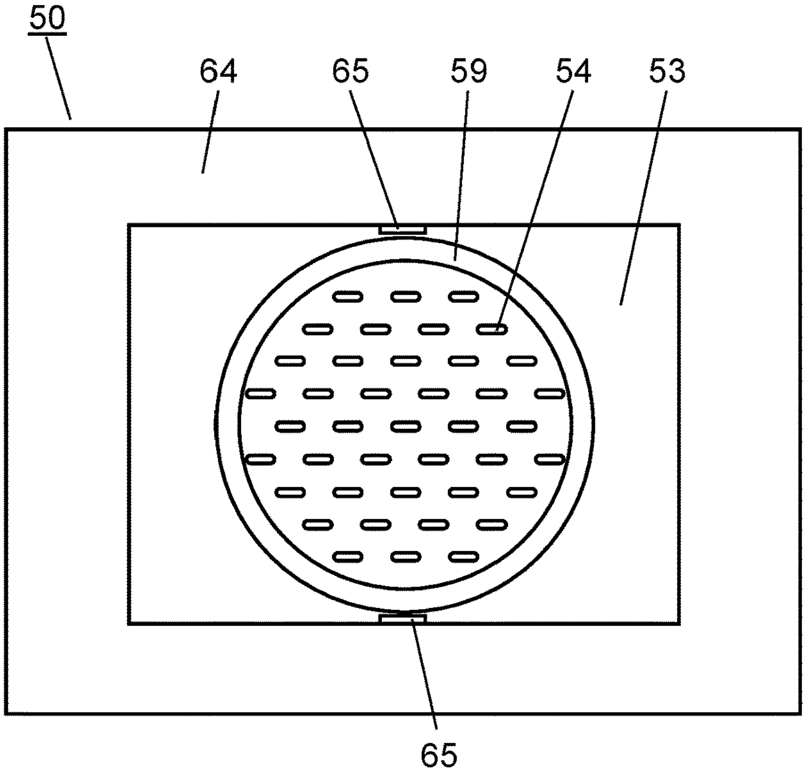
FIG. 12 is a top view of a loading table of a heating cooker according to a third exemplary embodiment of the present invention.

FIG. 12 is a top view of a loading table of the heating cooker according to the third exemplary embodiment of the present invention. FIG. 13 is a top view of a food container of the heating cooker according to the exemplary embodiment, where a cover is removed. FIG. 14 is a top cross-sectional view illustrating a configuration around a steam chamber of the heating cooker according to the exemplary embodiment.

Figure 13:
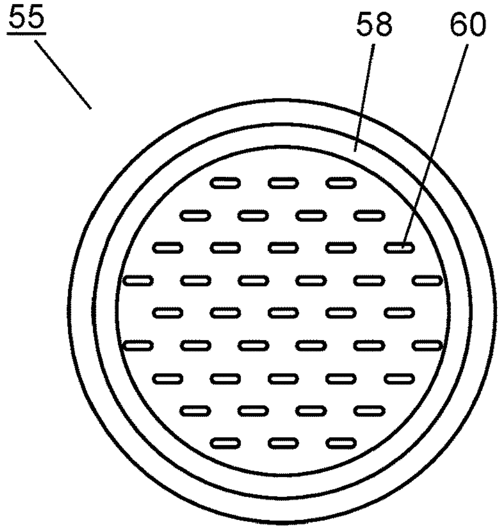
FIG. 13 is a top view of a food container of the heating cooker according to the third exemplary embodiment, where a cover is removed.
Figure 14:
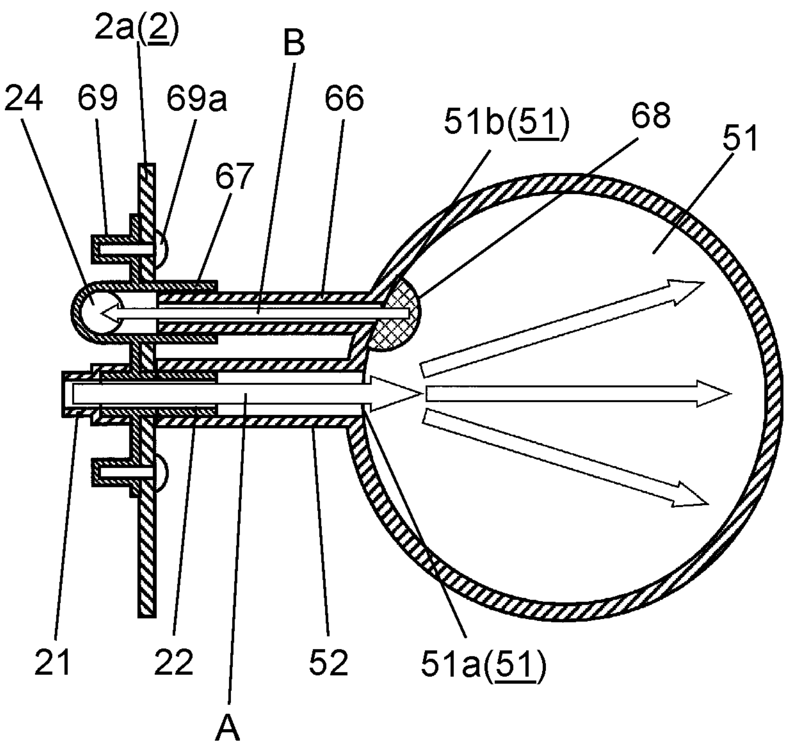
FIG. 14 is a top cross-sectional view illustrating a configuration around a steam chamber of the heating cooker according to the third exemplary embodiment.

As shown in FIG. 12 to FIG. 14, since food container 55 is configured in an approximately bottomed cylindrical shape (including bottomed cylindrical shape), and steam chamber 51, loading table 50, and opening plate 53 are configured accordingly, heating cooker 1 according to this exemplary embodiment differs from the heating cookers according to the first and second exemplary embodiments. Since other configurations and effects are identical to the configurations and effects of the first and second exemplary embodiments, identical components are applied with identical numbers or symbols, and detailed descriptions are omitted.

Differences from the configurations and operations of the first and second exemplary embodiments will now mainly be described herein.

First, as shown in FIG. 12, loading table 50 of heating cooker 1 according to this exemplary embodiment is formed in, for example, an approximately rectangular (including rectangular), thin-plate shape having an opening at a center, and includes flat portion 64 where no through hole is provided. Flat portion 64 is provided around opening plate 53 disposed on the opening.

Opening plate 53 is formed in, for example, an approximately rectangular (including rectangular), thin-plate shape, and is disposed on the opening of loading table 50.

Opening plate 53 includes opening plate holes 54, opening plate recess 59, opening plate notches 65, and the like. Opening plate recess 59 is formed in, at a center of opening plate 53, for example, an approximately circular shape (including circular shape).

Opening plate holes 54 are provided inside opening plate recess 59 that is formed. A plurality of opening plate recess 59 is each formed in, for example, an oval track having longer sides in a longitudinal direction of loading table 50, and is disposed in a zigzag manner.

As shown in FIG. 13, food container 55 is formed in, when viewed from top, for example, an approximately bottomed circular shape (including bottomed circular shape), and includes food container protrusion 58 and food container holes 60. Food container holes 60 are each formed in an approximately identical size and each disposed at approximately identical positions to a size and positions of opening plate holes 54 of opening plate 53.

Food container protrusion 58 is provided to correspond to opening plate recess 59 of opening plate 53 described above, and locks food container 55 through fitting. At this time, in order to prevent food container 55 from rotating, a protrusion or a recess is preferably provided on an outer circumference. In this case, in conformity to a protrusion or a recess of food container 55, a recess or a protrusion should be provided for fitting on an outer circumference of opening plate recess 59 of opening plate 53. Therefore, food container holes 60 and opening plate holes 54 can easily coincide. As long as steam can be supplied into food container 55, food container holes 60 and opening plate holes 54 may not fully coincide, but may partially coincide. In this case, it is not necessary that the above described protrusion or recess be formed.

As shown in FIG. 14, steam chamber 51 is formed in, when viewed from top, for example, an approximately cylindrical shape (including circular shape), and includes, for example, on an outer circumference, steam introduction channel 52 and steam chamber discharge channel 66. Steam introduction channel 52 and steam chamber discharge channel 66 are disposed in approximately parallel (including parallel) each other. Ends of steam introduction channel 52 and steam chamber discharge channel 66 are respectively coupled to steam chamber introduction opening 51*a* and steam chamber discharge opening 51*b* on a left wall surface side of steam chamber 51, and fixed to steam chamber 51. At this time, steam chamber introduction opening 51*a* coupled with the end of steam introduction channel 52 is formed aligned on a side wall near steam chamber discharge opening 51*b* coupled with the end of steam chamber discharge channel 66.

In other words, in this exemplary embodiment, steam chamber 51 is formed in, when viewed from top, an approximately circular shape. Therefore, steam flowed from steam introduction channel 52 evenly spreads into steam chamber 51 along an inner side wall of a cylinder. Therefore, the steam can evenly heat food 100 in food container 55 through opening plate holes 54 and food container holes 60.

In this exemplary embodiment, opening plate recess 59 of opening plate 53, food container 55, and steam chamber 51 each formed in, when viewed in plan, an approximately circular shape are exemplified. However, these components are merely examples. For example, the components may be formed in an arbitral shape such as an oval shape and a polygonal shape.

INDUSTRIAL APPLICABILITY

The present invention is applicable to heating cookers having a steam generating device, such as microwave ovens and steamers.

What is claimed is:

1. A heating cooker comprising:

a heating chamber for heating food;

a steam generating device for generating steam;

a steam chamber disposed in the heating chamber;

a steam introduction channel one end of which is coupled to the steam generating device and another end is coupled to the steam chamber, the steam introduction channel introducing steam generated by the steam generating device to the steam chamber; and a steam chamber discharge channel, wherein one end of which is coupled to the steam chamber, another end of the steam chamber discharge channel drains water condensed in the steam chamber to outside of the steam chamber.

2. The heating cooker according to claim 1, comprising:

a steam chamber discharge opening formed on a wall of the steam chamber and coupled to the steam chamber discharge channel; and a steam chamber introduction opening formed on the wall of the steam chamber and coupled to the steam introduction channel, wherein the steam chamber discharge opening is provided on a wall surface of the steam chamber near the steam chamber introduction opening.

3. The heating cooker according to claim 2, wherein a lower end of the steam chamber discharge opening is disposed at a position lower than a position of a lower end of the steam chamber introduction opening.

4. The heating cooker according to claim 1, comprising:

a steam chamber discharge introduction port for draining condensed water discharged via the steam chamber discharge channel from the steam chamber to drain to outside of the steam chamber, wherein the steam chamber discharge introduction port is detachably provided to the steam chamber discharge channel.

5. The heating cooker according to claim 4, comprising:

a steam ejection port detachably coupled to the steam introduction channel to eject steam generated by the steam generating device into the steam introduction channel, wherein the steam ejection port is provided near the steam chamber discharge introduction port.

6. The heating cooker according to claim 1, comprising:

a steam generating device discharge channel;

a heating chamber discharge channel;

a discharge channel; and a water discharge valve formed of a three-way valve coupled with the steam generating device discharge channel, the heating chamber discharge channel, and the discharge channel, wherein the water discharge valve switches the steam generating device discharge channel and the heating chamber discharge channel to couple the switched channel with the discharge channel.

7. The heating cooker according to claim 1, wherein the food is accommodated in a food container, and the food container is introduced with steam from the steam chamber to heat the food.

8. The heating cooker according to claim 7, wherein the food container is formed in a box shape having an opening or a cylindrical shape having an opening.

9. The heating cooker according to claim 1, wherein a maintenance mode is provided for forcibly draining condensed water in the steam chamber.

* * * * *